United States Patent [19]

Yokoyama

[11] 4,325,346
[45] Apr. 20, 1982

[54] FOUR-CYCLE INTERNAL COMBUSTION ENGINE

[75] Inventor: Hiroshi Yokoyama, Hamamatsu, Japan

[73] Assignee: Suzuki Jidosha Kogyo Kabushiki Kaisha, Hamana, Japan

[21] Appl. No.: 184,346

[22] Filed: Sep. 5, 1980

[51] Int. Cl.³ .............................................. F02M 25/06
[52] U.S. Cl. ............................... 123/568; 123/52 M; 60/293; 60/304; 60/307; 60/278
[58] Field of Search ............... 123/568, 571, 52 M, 123/52 MV; 60/293, 304, 305, 306, 307, 278, 279

[56] References Cited

U.S. PATENT DOCUMENTS

| 3,364,911 | 1/1968 | Baudry | 123/52 M |
| 3,678,905 | 7/1972 | Diehl | 123/52 M |
| 4,177,640 | 12/1979 | Kuroda et al. | 123/52 M |
| 4,218,880 | 8/1980 | Kuroda et al. | 123/568 |
| 4,231,339 | 11/1980 | Matsumoto et al. | 123/568 |
| 4,261,316 | 4/1981 | Motosugi et al. | 123/568 |
| 4,262,639 | 4/1981 | Motosugi et al. | 123/568 |
| 4,276,862 | 7/1981 | Matsumoto | 123/568 |

Primary Examiner—Wendell E. Burns
Attorney, Agent, or Firm—Quaintance & Murphy

[57] ABSTRACT

The present invention relates to a four-cycle internal combustion engine in which a strong swirl can be generated within the combustion chamber through the directionality of the mixed gas supplied from the main suction path and the injection of a gas from the sub-suction path, and a heavier EGR than before can be carried out without detracting the engine performance, and NOx generation can be substantially reduced by EGR alone. In time of idling when a heavy EGR is needless, the gas injection from the sub-suction path is controlled to prevent a misfiring.

13 Claims, 5 Drawing Figures

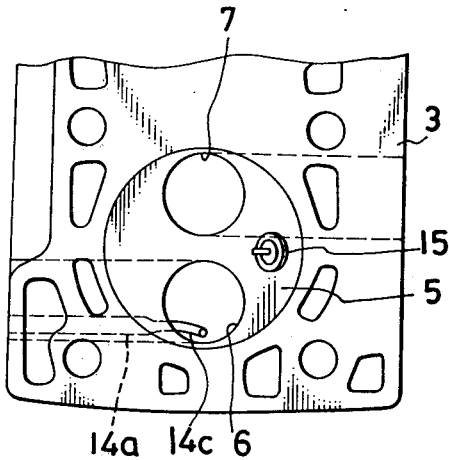
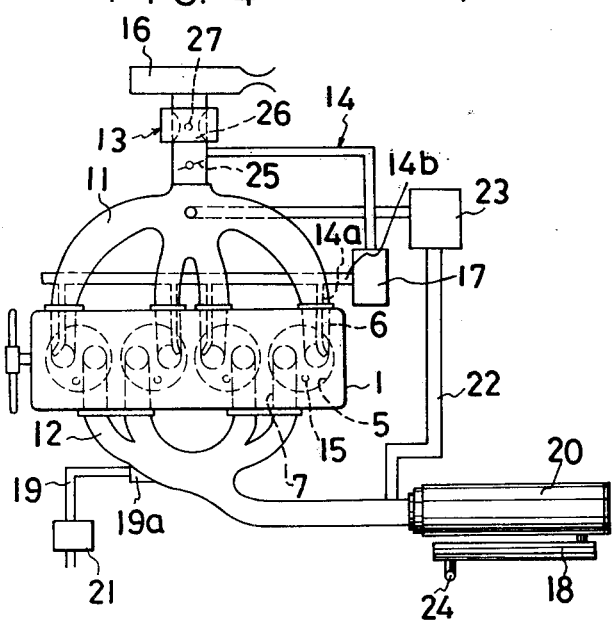
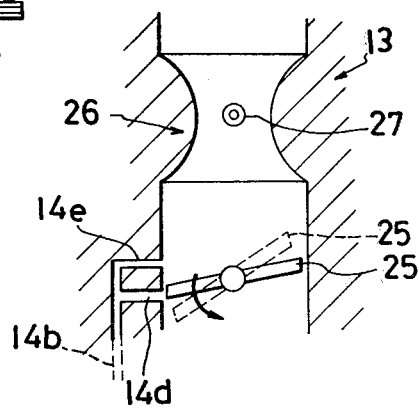

FOUR-CYCLE INTERNAL COMBUSTION ENGINE

BACKGROUND OF THE INVENTION

1. Field of the Invention

The present invention relates to a four-cycle internal combustion engine which permits a substantial reduction of the harmful elements in the exhaust, particularly NOx and enhancement of fuel economy without detracting the engine performance even under an extraordinarily heavy EGR (exhaust gas recirculation).

2. Description of Prior Art

Lately with introduction of strengthened measures for purification of auto exhaust gases a substantial reduction of the volume of NOx to be released into the atmosphere from automobiles under light and medium loads is being demanded.

Reduction of NOx can be carried out by two methods: The so-called pre-treatment, in which the gas mixture is burned such that the proportion of NOx released into the atmosphere can be suppressed lower; and the so-called post-treatment, in which NOx in the exhaust gases is rendered harmless with use of a reducing catalyst, etc.

It is common practice in the post-treatment to adopt a ternary catalyst (which possesses both the oxidizing and the reducing functions) for the purpose of reducing HC and CO too. In this case, however, the cost becomes very high, since an $O_2$-sensor for detecting the oxygen concentration in the exhaust gases and an electronically controlled mixed-gas generator for obtaining a highly precise air-fuel ratio are required.

In the case of the pre-treatment, it is common practice to make EGR for the purpose of reducing NOx and at the same time generate a swirl of the mixed gas in the combustion chamber, thereby increasing the combustion spread speed so that the engine performance may not deteriorate under EGR.

In this method, however, the swirl generated is not strong enough and in consequence the rate of EGR (the weight of exhaust gas against the total weight of suction gas) remains 10% at the most. Thus it has been impossible by EGR alone to reduce the volume of NOx to the level specified in the latest requirement. For this reason, in the current practice, besides EGR the spark is advanced before top dead center and a mixed gas of higher concentration than the theoretical air-fuel ratio is supplied, resulting in a poor fuel economy.

SUMMARY OF THE INVENTION

The main object of the present invention is to provide an internal combustion engine which permits a heavier EGR than usual without detracting the engine performance, thereby making it possible by EGR alone to substantially reduce the NOx generation, i.e., the volume of NOx contained in the exhaust gas.

Another object of the present invention is to provide an internal combustion engine which can reduce HC and CO as well as NOx contained in the exhaust to a sufficiently low level.

Still another object of the present invention is to provide an internal combustion engine which can accomplish the above two objects with a relatively simple and cheap constitution and make fuel consumption lower.

According to the present invention, a swirl of the mixed gas is generated in the combustion chamber, depending on the directionality of the gas supplied from the main suction path leading to the carburetor; and there is installed a sub-suction path with a less area of the effective opening than the main suction path, an injection of gas from said suction path into the combustion chamber further increasing the strength of a swirl of the mixed gas coming from the main suction path. Generation of such a strong swirl enables an extremely heavy EGR; that is, the rate of EGR can be raised to 10%–25%, thereby substantially suppressing the NOx generation itself.

Meanwhile HC, CO contents will be oxidized (and rendered harmless) by the oxidizing catalyst and the secondary air in the exhaust system.

The greatest feature of the present invention lies in that a relatively simple constitution suffices to adequately reduce the harmful elements in the exhaust gas. This comes from the fact that a conventional carburetor as it is can be applied for the purpose. It is also a great advantage of the present invention that it is applicable to engines of from relatively small to large displacements. Moreover, according to the present invention, which needs no adjustment of spark angle in time of EGR and no supply of a more rich gas mixture, the fuel economy can be improved.

Other objects and features of the invention will become apparent to those skilled in the art from the disclosure made in the following description of a preferred embodiment of the invention, as illustrated in the accompanying sheet of drawings.

BRIEF DESCRIPTION OF THE DRAWINGS

FIG. 3 is a transverse cross-section view of the part in FIG. 2.

FIG. 4 is a diagram systematically illustrating another embodiment of the invention.

FIG. 5 is a partial section view of a part of still another embodiment of the present invention.

DETAILED DESCRIPTION OF THE PREFERRED EMBODIMENT

Figure 1:
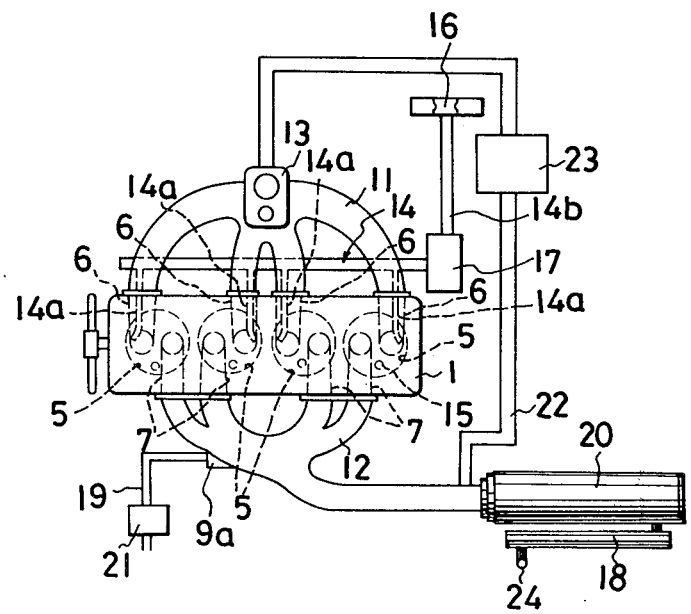
FIG. 1 is a diagram systematically illustrating one embodiment of the present invention.
Figure 2:
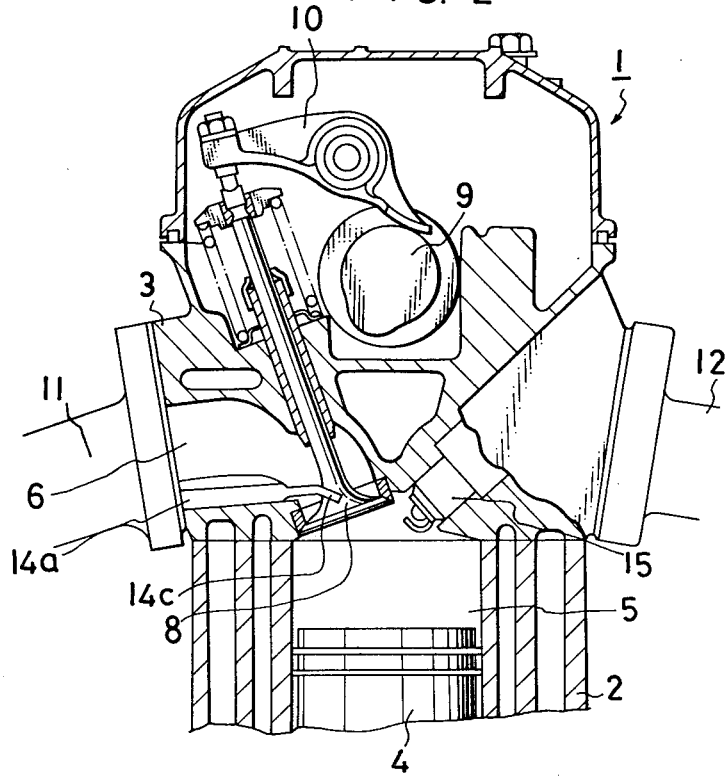
FIG. 2 is a longitudinal section view of a part in the embodiment of FIG. 1.

In FIGS. 1 and 2, 1 is a 4-cycle serial 4-cylinder engine, each component engine consisting, just like the conventional one, of a cylinder 2, a cylinder head 3 and a piston 4. Into each of the four combustion chambers 5 defined by these components 2, 3, and 4, are opened a suction port 6 and an exhaust port 7 each constituted in the cylinder head 3. The ports 6 and 7 are respectively opened or closed by means of a suction valve 8 and an exhaust valve (not shown). The operation of the suction valve 8 is controlled by a control mechanism comprising a cam 9 and a rocker arm 10; and that of the exhaust valve is controlled by a similar mechanism (not shown).

The suction port 6 is connected to a suction manifold 11, while the exhaust port 7 is connected to an exhaust manifold 12. The suction manifold 11 is at its branching point connected to a carburetor 13. The suction port 6 and the suction manifold 11 complete a main suction path extending from the carburetor 13 to the combustion chamber 5. As indicated in FIG. 3, the suction port 6 points approximately in tangential direction toward the wall of the combustion chamber 5 (the wall of the cylinder 2), so that the mixed gas supplied through this port generates a swirl around the axis of the cylinder 2 within the chamber 5. The swirl is formed to sweep past a spark plug 15 and then move in the direction of the exhaust port 7. It should be noted that the suction port 6 is not designed with any extreme directionality, lest its volumetric efficiency should drop under high load.

Each of the combustion chambers 5 is supplied (by suction stroke) with a gas from a sub-suction path 14 as well as with a mixed gas from the main suction path. The sub-suction path 14 is constituted by four branches 14a, that is, corresponding to the number of cylinders installed, and one converging path 14b of a larger diameter to which all of the branches 14a converge; the effective opening area of the sub-suction path is made sufficiently smaller than that of the main suction path. The end of each branch 14a, i.e., the outlet of the sub-suction path 14 terminates as indicated in FIG. 2 in a small-diameter jet nozzle 14c, which opens just upstream of the suction valve 8, pointing, as indicated in FIG. 3, in tangential direction toward the combustion chamber 5 (the side wall of the chamber 5, i.e., the inner wall of the cylinder 2).

Therefore, when the gas is injected (sucked) into the combustion chamber 5 through the jet nozzle 14c, a swirl will be generated therein, but said swirl will rotate in the same direction as the mixed gas from the main suction path.

Meanwhile the end of the sub-suction path 14, i.e., the end of the converging path 14b opens through an air cleaner 16 into the atmosphere. The converging path 14b is attached with a control valve 17 to control the volume of the gas supplied from the sub-suction path. This control valve 17 serves at least to reduce the effective opening area of the sub-suction path 14 under idling condition.

For instance, it may be designed as a valve mechanically interlocked with a throttle valve (not shown in FIG. 1) of the carburetor 13 or as one actuated by the negative pressure in the main suction path.

Meanwhile an exhaust system extending from the exhaust port 7 via the exhaust manifold 12 to the muffler 18 has a secondary air intake pipe 19 connected thereto and internally holds an oxidizing catalyst 20 downstream of the secondary air intake port 19a. A secondary air supply device 21 is connected to the secondary air intake pipe 19; and it may be constituted as a reed valve to be operated by the pulsating pressure of exhaust gas, in the same way as in the conventional device; or as a secondary air supply pump. An EGR pipe 22 branches out from the exhaust system midway between the two elements 19a and 20, the end of the pipe 22 being connected to the junction of the suction manifold 11 downstream of the carburetor 13. An EGR valve 23 as EGR regulator for the purpose of adjusting the rate of EGR is attached to the EGR pipe 22.

The oxidizing catalyst 20 may be the same one as employed conventionally and the EGR valve 23 may be the same one as employed conventionally, for instance, a negative-pressure acting one to be controlled by the negative pressure in the suction pipe. In FIG. 1, 24 denotes an exhaust gas outlet.

Next, the performance of the above constitution will be described for different engine loads.

(1) Light and medium load running range

This is a so-called normal running range, under which the opening of a throttle valve 25 (see FIG. 4 - not shown in FIG. 1) in the carburetor 13 is relatively narrow, while the opening of the EGR valve 23 is made wide enough and the opening of the control valve 17 for the sub-suction path is made wide, too.

Under these conditions, the mixed gas formed in the carburetor 13 and the exhaust gas coming from the EGR pipe 22 go via the main suction path into the combustion chamber 5, while the air coming from the sub suction path 14 is separately supplied to the combustion chamber 5. Thus, the swirl of the mixed gas supplied to the combustion chamber 5 is promoted both by the directional action of the suction port 6 to help the swirl and by the effect of the air supplied from the sub-suction path 14 and in consequence the combustion is accelerated on account of homogenized atomization of the mixed gas and an increased combustion spread speed.

Particularly the negative pressure of suction developed in the combustion chamber 5 is so large that an extremely wide difference is caused between the two ends of the sub-suction path 14, i.e., between the jet nozzle 14c and the air cleaner communicating with the atmosphere. Thus the air issues from the nozzle 14c at a very high speed (nearly sonic), making the swirl by far stronger than before. Therefore, a heavy EGR can be carried out without detracting the engine performance.

As for the air/fuel ratio under this load range, the rate of EGR can be increased to 10%-25% at A/F of 15-16 near to the theoretical A/F ratio without advancing the spark angle as required before for avoiding knocking to be caused by EGR. Here the A/F means the ratio between the air volume supplied from the two suction paths to the combustion chamber 5 and the fuel volume suplied from the main suction path.

To prevent a misfiring, G/F, i.e., the ratio of the total gas volume (air+exhaust) supplied to the combustion chamber to the fuel volume is set lower than 21.

Naturally, the supply from the two suction paths to the combustion chamber 5 should be timed to the operation of the suction valve 8.

(2) Heavy load running range

Under this range with a wide opening of the throttle valve in the carburetor 13, the effective opening areas of the two suction paths cause the air volume supplied from the sub-suction path 14 to be relatively small as compared with the gas volume supplied from the main suction path. Therefore a swirl generation caused by the flow from the sub-suction path 14 becomes relatively small.

However, it poses no problem in this case that a heavy EGR is impossible, because the swirl generated by the directional action of the suction port 6 is considerably strong and NOx reduction is not so important as development of sufficient output in this range. In this case too a mixed gas of A/F ratio of 15-16 near to the theoretical A/F is supplied to the combustion chamber 5.

(3) No-load running range (idling)

Under this range the throttle valve in the carburetor 13 is almost shut and the fuel is sucked in through the idle port (not shown) of the carburetor 13. Meanwhile a large negative pressure of suction emerges in the combustion chamber 5 and accordingly the opening of the control valve 17 for the sub-suction path 14 is narrowed to reduce the air volume from the path 14.

This is done, because a misfiring is likely to happen on account of excess air over the fuel volume supplied, if the effective opening area of said path 14 is left wide. In this case too, on account of a fairly strong swirl generated, combustion spread speed is enhanced and the necessary amount of the fuel in the mixed gas is reduced and the fuel is supplied at the approximately theoretical A/F to the combustion chamber 5. Thus the fuel economy is substantially improved as compared with running at A/F of about 12 in the conventional device for reducing NOx.

In the cases described above, HC and CO (especially HC which is produced more) which are contained in the exhaust gas in increasing amounts as the result of a heavy EGR are oxidized and rendered harmless with use of the secondary air and the oxidizing catalyst 20.

FIG. 4 illustrates another embodiment of the invention. In this embodiment the inflow end of the sub-suction path 14 opens in the passage between the throttle valve 25 and the venturi 26 of the carburetor 13. Thereby all the air supplied to the combustion chamber 5 is measured at the venturi 26 and this is favourable for securing a specified A/F.

FIG. 5 illustrates still another embodiment of the invention. In this embodiment the end of the converging path 14b for the sub-suction path 14 bifurcates and the two branches 14d, 14e which respectively serve as inflow paths are opened in the flowing passage of the carburetor 13. The downstream branch 14d is located at such a position that it can be closed by the throttle valve 25 (indicated by a solid line) during idling and it comes upstream of the throttle valve 25 when the latter is open.

The upstream branch 14e is opened between the throttle valve 25 and the venturi 26. In time of idling the effective opening area of the sub-suction path 14 is thereby made narrower than under the light and medium load range. Namely, the branch 14d and the throttle valve 25 constitute the control device 17 for the sub-suction path, simplifying the mechanism as compared with the case of a control valve being installed separately. Of course, the air supplied to the combustion chamber 5 is invariably measured at the venturi 26, which is favourable for securing a specified A/F. In this embodiment, the end of the converging path 14 are bifurcated, but this construction is not restrictive. The end of the path 14 may be divided into more than two branches, one inflow end of which is located at such a position that it can be closed by the throttle valve 25 during idling and the other inflow ends of which are opened between the throttle valve 25 and the venturi 26. It should be added that in both FIG. 4 and FIG. 5, a mixed gas (fuel from the main fuel system opening at the venturi 26+air) will flow through the sub-suction path 14 under the light to heavy load running ranges.

I claim:

1. Four-cycle internal combustion engine which permits recirculation of exhaust gas to the combustion chamber, comprising:
   a main suction path extending from the carburetor to the combustion chamber and opening into said combustion chamber, said main suction path being designed such that the mixed gas passing through said main suction path may develop a swirl in said combustion chamber;
   a sub-suction path having a less wide effective opening area than said main suction path and having its outlet directed in tangential direction of the side wall of said combustion chamber so that the swirl generated in said main suction path may be promoted;
   and a control device to control the gas volume flowing in said sub-suction path in such a way as reduce the effective opening area of said sub suction-path at least in time of idling.

2. Four-cycle internal combustion engine of claim 1, wherein the suction gas into the combustion chamber is a mixture of the mixed gas around the theoretical A/F and a large volume of exhaust gas exceeding the conventional limit of exhaust gas recirculation.

3. Four-cycle internal combustion engine of claim 1 or 2, wherein a secondary air intake opening in an exhaust system, a secondary air supply device connected to said secondary air intake and an oxidizing catalyst located in said exhaust system downstream of said secondary air intake are provided.

4. Four-cycle internal combustion engine of any of claim 1 to 3, wherein an EGR path which connects the exhaust system to a part of the main suction path downstream of the carburetor is provided so that the exhaust gas recirculates to the combustion chamber via the main suction path.

5. Four-cycle internal combustion engine of any of claims 1 to 4, wherein an EGR volume controller to control the EGR volume is provided.

6. Four-cycle internal combustion engine of any of claims 1 to 5, wherein the rate of EGR is set at 10–25%.

7. Four-cycle internal combustion engine of any of claims 1 to 6, wherein said control device for the sub-suction path is a valve connected to the sub-suction path and mechanically interlocked with a throttle valve of the carburetor.

8. Four-cycle internal combustion engine of any of claims 1 to 6, wherein said control device for the sub-suction path is a valve connected to the sub-suction path and responding to the magnitude of the negative pressure developed in the main suction path.

9. Four-cycle internal combustion chamber of any of claims 1 to 6, wherein the end of the sub-suction path is devided into two or more branches; the end of one branch is opened in the flowing passage of the carburetor so that said branch may be closed by the throttle valve of the carburetor during idling, while the ends of the other branches are opened upstream of said throttle valve, so that the control device for the sub-suction path may be composed of said throttle valve and the end of the branch to be closed by the throttle valve.

10. Four-cycle internal combustion engine of claim 9, wherein the ends of said other branches are opened in the flowing passage of the carburetor downstream of the venturi of the carburetor.

11. Four-cycle internal combustion engine of any of claims 1 to 8, wherein the inflow end of the sub-suction path is opened in the flowing passage of the carburetor between the throttle valve and the venturi of the carburetor.

12. Four-cycle internal combustion engine of any of claims 1 to 8, wherein the inflow end of the sub-suction path is opened into the atmosphere via an air-cleaner.

13. Four-cycle internal combustion engine of any of claims 1 to 12, wherein the outflow end of the sub-suction path is opened just upstream of the suction valve for the main suction path so that said end of the sub-suction path may connect to the combustion chamber, when said suction valve is open.

* * * * *